United States Patent
Kim et al.

(10) Patent No.: US 7,429,913 B2
(45) Date of Patent: Sep. 30, 2008

(54) LOW POWER DIGITAL CIRCUIT FOR RFID TAG

(75) Inventors: Sun Hee Kim, Seoul (KR); Sang Kyun Lee, Gwangju (KR); Kyung Hwan Park, Daejeon (KR); Seong Su Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 557 days.

(21) Appl. No.: 11/123,002

(22) Filed: May 6, 2005

(65) Prior Publication Data

US 2006/0109087 A1     May 25, 2006

(30) Foreign Application Priority Data

Nov. 24, 2004   (KR) ...................... 10-2004-0096677

(51) Int. Cl.
   *H04Q 5/22*   (2006.01)
(52) U.S. Cl. ................. 340/10.34; 340/10.1; 340/572.1
(58) Field of Classification Search ............. 340/10.34, 340/10.1, 572.1
   See application file for complete search history.

(56) References Cited

U.S. PATENT DOCUMENTS 5,621,412 A   4/1997   Sharpe et al.

FOREIGN PATENT DOCUMENTS

KR   2004-0007901   1/2004

OTHER PUBLICATIONS

P. Villard, et al.; "A low-voltage mixed-mode CMOS/SOI integrated circuit for 13.56 MHz RFID applications"; 2002 IEEE International SOI Conference; Oct. 2002; pp. 163-164.
Shoichi Masui, et al.; "A 13.56MHz CMOS RF Identification Transponder Integrated Circuit With A Dedicated CPU"; 1999 IEEE International Solid-State Circuits Conference; Feb. 16, 1999; pp. 162-163.
Andre Abrial, et al.; "A New Contactless Smart Card IC Using an On-Chip Antenna and an Asynchronous Microcontroller"; 2001 IEEE Journal of Solid-State Circutis; Jul. 2001; vol. 36, No. 7; pp. 1101-1107.

*Primary Examiner*—Edwin C Holloway, III
(74) *Attorney, Agent, or Firm*—Lowe Hauptman Ham & Berner LLP

(57) ABSTRACT

Provided is a digital circuit for a passive RFID tag. The digital circuit for the passive RFID tag includes a construction that is divided into blocks, which receive a command, analyze and execute the command, and generate a reply signal respectively, according to the flow of data. Thus, the digital circuit transmits a clock signal to each of the blocks at a rate optimized for the block such that the blocks sequentially operate without any additional controller. The digital circuit for the RFID tag is constructed such that the respective blocks operate at different points in time. This precludes any useless operation of hardware, thus reducing the entire power dissipation.

12 Claims, 4 Drawing Sheets

LOW POWER DIGITAL CIRCUIT FOR RFID TAG

CROSS-REFERENCE TO RELATED APPLICATION

This application claims priority to and the benefit of Korean Patent Application No. 2004-96677, filed Nov. 24, 2004, the disclosure of which is incorporated herein by reference in its entirety.

BACKGROUND

1. Field of the Invention

The present invention relates to a digital circuit for a passive radio frequency identification (RFID) tag and, more particularly, to a low power digital circuit for a passive RFID tag, which is divided into sequential blocks according to the flow of data and transmits an optimized clock signal to each of the blocks only when the block should perform an operation.

2. Discussion of Related Art

In a passive RFID system, when a reader produces a radio frequency (RF) signal, a tag converts the RF signal into direct current (DC) power and employs the DC power as power required for driving the entire circuits therein. Thus, the tag needs to be designed such that it operates at low power. Such a tag includes an analog circuit, a digital circuit, and a memory. The analog circuit includes a driving power generation block and a clock signal generation block. The digital circuit analyzes a command issued from the reader and supports an RFID protocol. Because the digital circuit consumes more power than the analog circuit or the memory, designing the digital circuit to operate at low power is necessary.

In order to embody a low power digital circuit, an application specific integrated circuit (ASIC) is more appropriate than a central processing unit (CPU) or a digital signal processor (DSP). In the case of a CMOS ASIC, power is mostly consumed due to a current that flows when a capacitor of a chip is charged or discharged. This can be approximated as shown in the following Equation:

$$\text{Consumed power} = V_{dd}^2 * C * \text{Freq},$$

where $V_{dd}$ refers to a voltage, C refers to a capacitance of a logic, and F refers to a speed at which a capacitor is charged/discharged.

In this connection, the conventional digital circuit for the passive RFID tag, which is synchronized with a clock signal, consumes different amounts of power according to a clock rate. Therefore, in order to embody a low power clock-synchronized digital circuit, the digital circuit should be operated at such a minimum clock rate that meets required performance.

SUMMARY OF THE INVENTION

The present invention is directed to providing a low power digital circuit for a passive RFID tag.

One aspect of the present invention is to provide a digital circuit for an RFID tag, which transmits and receives predetermined data via an analog circuit connected to an antenna, comprising a construction that is divided into sequential blocks, which receive a command, analyze and execute the command, and generate a reply signal, respectively, according to the flow of data, and is controlled such that the blocks sequentially operate.

The digital circuit may include a construction that transmits a clock signal having an optimized rate to each of the blocks.

The digital circuit may include a construction in which each of the blocks requires the enabling of other blocks.

The digital circuit may include a construction in which each of the blocks requires the disenabling of itself.

Another aspect of the present invention is to provide a digital circuit for an RFID tag, comprising: a command detector for detecting command information in a data signal received from an analog circuit and determining a symbol timing to detect a preamble of the command information; a reader-tag bit decoder for decoding bit data encoded in the command information; a command analyzer for discerning the types of commands based on the decoded bit data and classifying parameters according to the types of commands; a command executor for executing an operation and transiting a tag's state in response to the analyzed command, the command executor including a reply signal organizer for organizing a reply signal to be transmitted to a reader; a tag-reader bit encoder for performing bit encoding in response to the reply signal to be transmitted to the reader; a memory controller for writing data in a memory or reading data from the memory in response to a memory control signal; and a clock signal generator for receiving output signals of each of the blocks to enable or disable clock signals of other blocks.

BRIEF DESCRIPTION OF THE DRAWINGS

The above and other features and advantages of the present invention will become more apparent to those of ordinary skill in the art by describing in detail preferred embodiments thereof with reference to the attached drawings in which.

DETAILED DESCRIPTION OF PREFERRED EMBODIMENTS

The present invention will now be described more fully hereinafter with reference to the accompanying drawings, in which preferred embodiments of the invention are shown. This invention may, however, be embodied in different forms and should not be construed as limited to the embodiments set forth herein. Rather, these embodiments are provided so that this disclosure is thorough and complete and fully conveys the scope of the invention to those skilled in the art.

Figure 1:
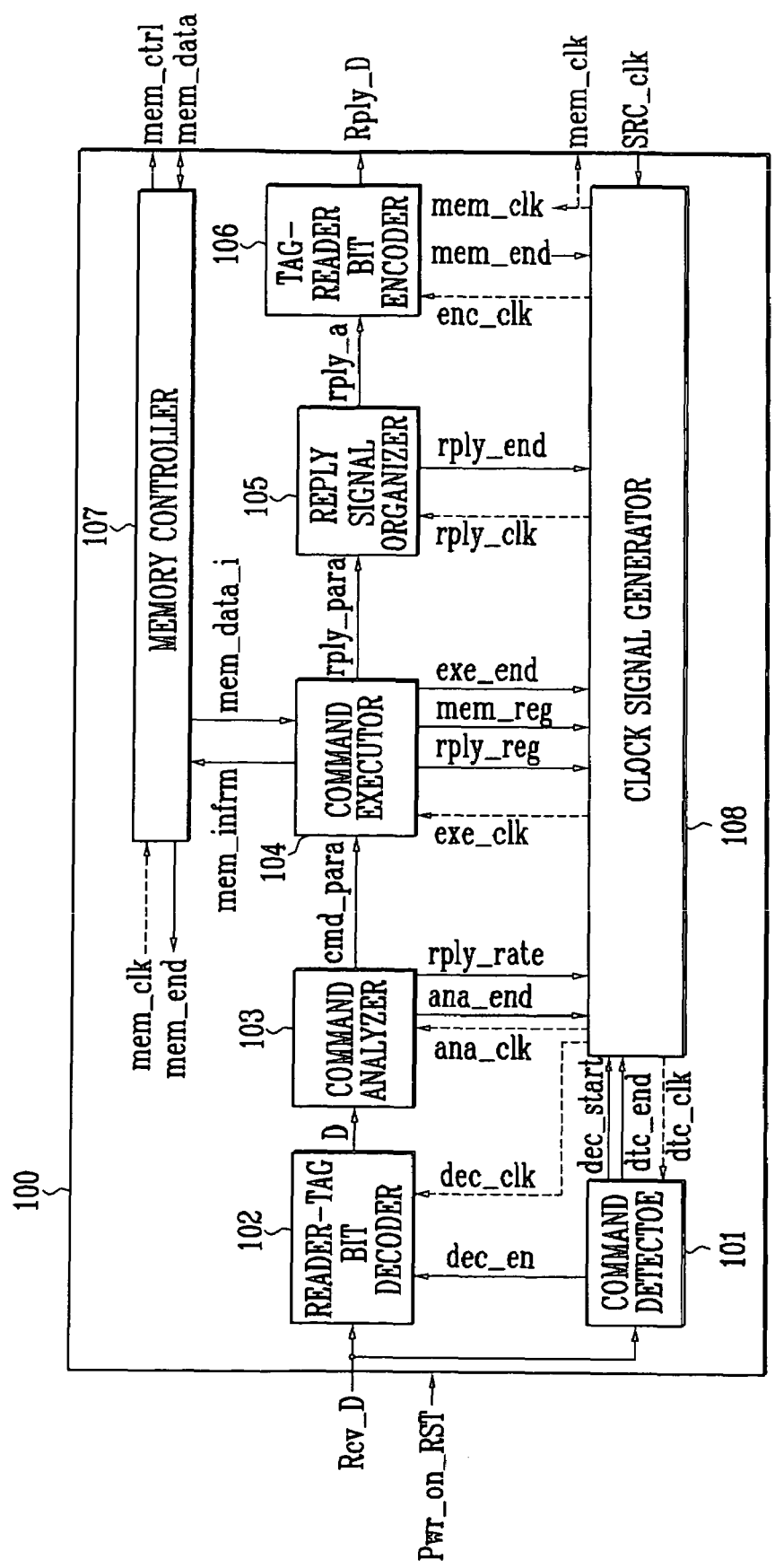
FIG. 1 is a block diagram of a digital circuit for a radio frequency identification (RFID) tag according to an embodiment of the present invention.

FIG. 1 is a block diagram of a digital circuit for a passive radio frequency identification (RFID) tag according to an embodiment of the present invention. The digital circuit 100 for the passive RFID tag of FIG. 1 conforms to EPC (Electronic Product Code) Global Generation 2 UHF RFID Tag Class 1 Draft Version 1.0.4.

Referring to FIG. 1, the digital circuit 100 for the passive RFID tag includes a command detector 101, a reader-tag bit decoder 102, a command analyzer 103, a command executor 104, a reply signal organizer 105, a tag-reader bit encoder 106, a memory controller 107, and a clock signal generator 108. The digital circuit 100 for the passive RFID tag receives a source clock signal SRC_clk, a power-on-reset signal Pwr_on_RST, and a data signal Rcv_D and outputs a modulated reply signal Rply_D.

In the embodiment of the present invention, the bit rate of a reply signal of the tag may be equal to or 2 to 4 times as fast as that of a command that sends from a reader to the tag. Because the bit rate of the reply signal of the tag is transmitted as a parameter of the command to the tag, it cannot be known until the analysis of the command is finished. Also, the reply signal is FM0 coded and sent to the reader. Here, the FM0 coding is a mode in which a high-to-low or low-to-high transition made during a bit period is referred to as logic 0, while no level transition is referred to as logic 1. Accordingly, FM0 encoding requires a clock signal having a rate twice as fast as the bit rate. As a result, since a clock signal having a rate at least 8 times as fast as the bit rate of a command should be input to the digital circuit, the source clock signal SRC_clk, which is 8 times as fast as the bit rate of the command, is input to the digital circuit for the purpose of low power operation in the present embodiment.

Figure 2:
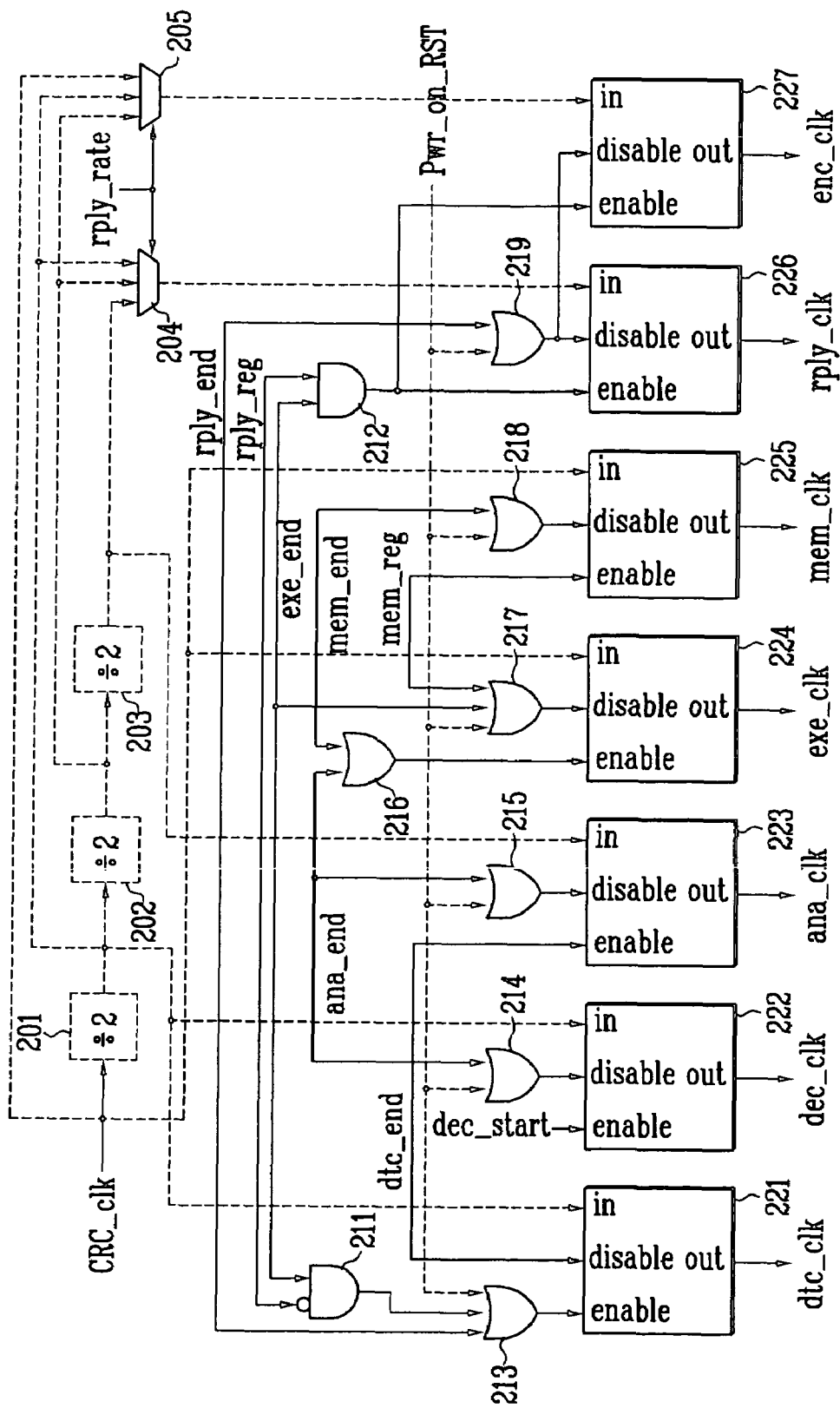
FIG. 2 is a block diagram of a clock signal generator shown in FIG. 1.

FIG. 2 is a block diagram of the clock signal generator 108 shown in FIG. 1. The clock signal generator 108 will now be described in detail with reference to FIGS. 1 and 2.

At the outset, when the clock signal generator 108 receives a power-on-reset signal Pwr_on_RST, it enables only a command detector clock signal dtc_clk. In the present embodiment, a command sent from the reader is Manchester encoded. The Manchester encoding is a mode in which a level transition is made during a bit period, and a high-to-low transition is referred to as logic 1, while a low-to-high transition is referred to as logic 0. Because the command detector 101 uses a preamble of the Manchester-encoded command, the clock rate of the command detector 101 may be at least 4 times as fast as the transmission bit rate. Thus, the clock signal generator 108 2-divides the source clock signal SRC_clk and transmits the divided signal to the command detector 101.

The command detector 101 compares Manchester-encoded command preamble data with input data signals, determines a clock timing at which small errors occur, and produces a decoding enable signal dec_en at the corresponding clock timing. After that, the command detector 101 outputs a decoding start signal dec_start and a detector operation end signal dtc_end before two bit periods and one bit period from the end of the preamble, respectively.

When the clock signal generator 108 receives the decoding start signal dec_start from the command detector 101, it drives the reader-tag bit decoder 102 at a clock rate equal to that of the command detector clock signal dtc_clk. Then, if the clock signal generator 108 receives the detector operation end signal dtc_end, it 8-divides the source clock signal SRC_clk, transmits a clock signal having a clock rate equal to that of the bit rate of the command to the command analyzer 103, and disables the command detector clock signal dtc_clk. Accordingly, after the decoding start signal dec_start is generated, both the command detector 101 and the reader-tag bit decoder 102 perform operations until the detector operation end signal dtc_end is generated. In this case, the reader-tag bit decoder 102 stores the timings of the decoding enable signal dec_en.

At each of the timings of the decoding enable signal dec_en, the reader-tag bit decoder 102 Manchester decodes a data signal Rcv_D and transmits the Manchester-decoded data signal Rcv_D to the command analyzer 103. The command analyzer 103 discerns the types of commands, classifies parameters according to the types of commands, and outputs a command analysis end signal ana_end.

When the clock signal generator 108 receives the command analysis end signal ana_end, it disables a reader-tag bit decoder clock signal dec_clk and a command analyzer clock signal ana_clk and enables a command executor clock signal exe_clk. The clock rate of the command executor 104 is determined in consideration of the number of clocks required to execute a command in a digital logic and the timing condition according to the RFID protocol. In the present embodiment, since a clock signal having a rate 8 times as fast as the bit rate of the command is appropriate, the command executor 104 generates the command executor clock signal exe_clk at a rate equal to that of the source clock signal SRC_clk.

The command executor 104 reads commands and command parameters cmd_para from the command analyzer 103 and executes the command according to the present tag's state, for example, a ready state, a reply state, an acknowledged state, an authenticated state, or a killed state.

When data is to be read from or written in a memory, the command executor 104 outputs a memory request signal mem_req. Then, the clock signal generator 108 disables the command executor clock signal exe_clk and enables a memory clock signal mem_clk.

When the memory controller 107 receives a clock signal, it reads memory request information mem_infrm from the command executor 104 and performs a requested operation. After the operation is finished, the memory controller 107 outputs a memory control end signal mem_end. Also, the clock signal generator 108 disables the memory clock signal mem_clk again and enables the command executor clock signal exe_clk to reactivate the command executor 104.

After the execution of the command is finished, if the tag needs to send a reply to the reader, the command executor 104 outputs a reply request signal rply_req as well as an execution end signal exe_end. When the clock signal generator 108 receives the execution end signal exe_end, it disables the command executor clock signal exe_clk. Also, the clock signal generator 108 enables a clock signal of the reply signal organizer 105 and a clock signal of the tag-reader bit encoder 106 in response to the reply request signal rply_req. In this case, the bit rate rply_rate of the reply signal is read from the command analyzer 103, and a clock signal having a rate twice as fast as the bit rate rply_rate of the reply signal is transmitted to the tag-reader bit encoder 106. In addition, when the clock signal generator 108 receives only the execution end signal exe_end without the reply request signal rply_req, it enables the command detector clock signal dtc_clk and waits for a new command.

The reply signal organizer 105 receives a reply signal parameter rply_para from the command executor 104, organizes a reply signal, and transmits the reply signal to the tag-reader bit encoder 106. The reply signal organizer 105 may include a random number (RN) generator, which generates a predetermined RN in reply to a tag's state, and be included in the command executor 104.

The tag-reader bit encoder 106 FM0 encodes the reply signal. Once the reply signal organizer 105 outputs a reply signal end signal rply_end, the clock signal generator 108 disables both the reply signal clock signal rply_clk and an encoder clock signal enc_clk and enables the command detector clock signal dtc_clk again and thus, waits for a next command.

In the above-described construction, the clock signal generator 108 determines whether a clock signal is to be enabled or disabled only depending on signals transmitted from the respective blocks. That is, when a block transmits an operation end signal to the clock signal generator 108, the clock signal generator 108 disables a clock signal of the block and enables a clock signal of the next block automatically or in response to a start request signal of the next block, so that no additional controller for scheduling clock signals is required.

For this operation, the clock signal generator 108, as exemplarily shown in FIG. 2, may be comprised of 3 dividers 201, 202, and 203, each of which 2-divides a source clock signal SRC_clk, 2 multiplexers 204 and 205, each of which multiplexes an output signal of each of the dividers 201, 202, and 203, a plurality of gates 211, 212, 213, 214, 215, 216, 217, 218, and 219, each of which performs a logical operation with an output signal of each block, and a plurality of flip-flops 221, 222, 223, 224, 225, 226, and 227, each of which produces a clock signal required for each block in response to an output signal of each of the dividers 201, 202, and 203, each of the multiplexers 204 and 205, and/or each of the gates 211, 212, 213, 214, 215, 216, 217, 218, and 219.

Figure 3A:
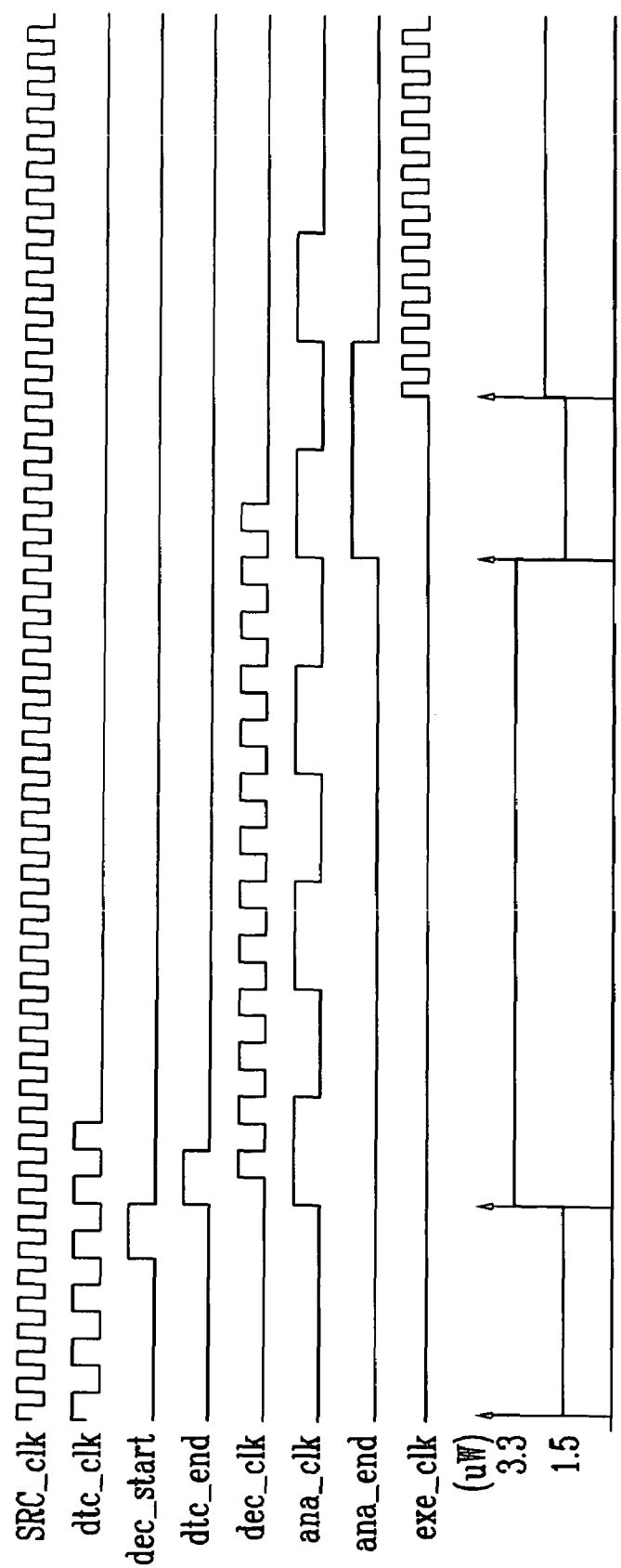
FIGS. 3A and 3B are waveform diagrams showing respective clock signals and dynamic variations in the whole power while the digital circuit for the RFID tag of FIG. 1 is executing password commands.
Figure 3B:
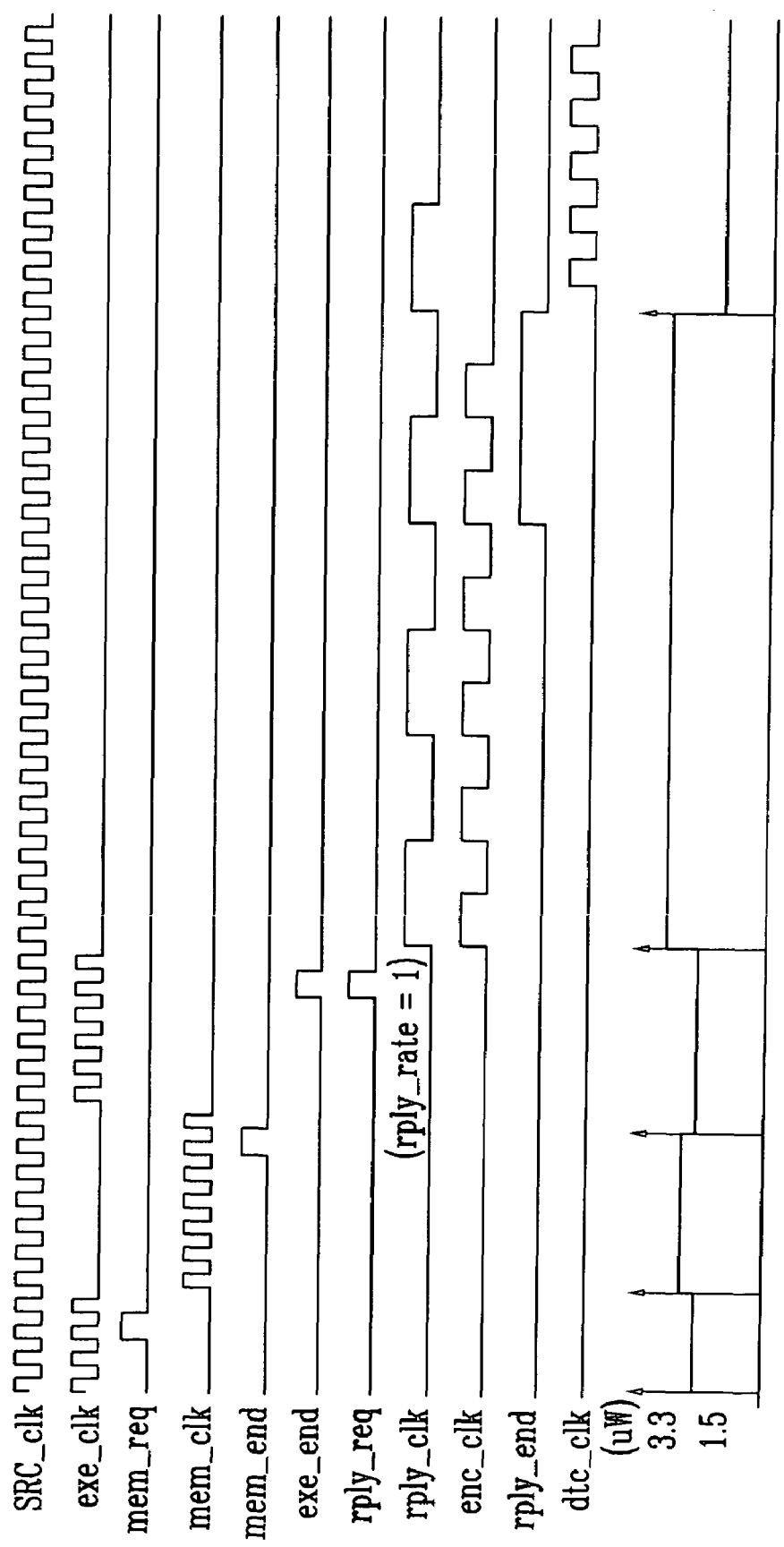

FIGS. 3A and 3B are waveform diagrams illustrating respective clock signals and dynamic variations in the whole power while the digital circuit for the RFID tag of FIG. 1 is executing password commands. Hereinafter, the simulation and composition results of the present invention will be described with reference to FIGS. 3A and 3B.

In the present embodiment, a simulation was performed using a Cadence NC-verilog simulator, and composition and power consumption were evaluated by a Synopsis Design-Compiler and a Power-Compiler, respectively, based on the digital library of a 2.5V 0.25 μm CMOS process of Hynix Semiconductor.

In the present embodiment, in order to reduce the power consumption of a tag, a module-level clock-gating technique was adopted. More specifically, in a default state where only a command detector clock signal is enabled, signals for enabling a reader-tag bit decoder and a command analyzer are input. Then, the reader-tag bit decoder decodes a command and transmits the decoded command to the command analyzer, and the command analyzer derives command information from the decoded command. Once the command analyzer finishes analyzing the command information, the reader-tag bit decoder and the command analyzer are disabled, and a command executor is enabled. Also, a memory controller is enabled for a while to compare parameters in the analyzed command with tag passwords stored in a memory. While a carrier wave frequency signal of a reader is modulated by ID data of the tag and backscattered, a reply signal organizer and a tag-reader bit encoder are enabled.

As can be seen from FIGS. 3A and 3B, the simulation result shows that power consumed during the operation of the digital circuit for the passive RFID tag did not exceed 3.3 μW (2.5 V).

Further, the simulation result was obtained by performing register-level clock gating for each block using the Power-Compiler. Here, a feedback multiplexer loop was removed, and a clock gating control logic was inserted as a register clock input. As a result, about 30% of power consumed during the operation of the digital circuit was reduced.

The gate count and clock frequency of each of the blocks are arranged in Table 1.

TABLE

| Block | Gate count | Clock frequency (kHz) |
|---|---|---|
| Command detector | 279 | 80 |
| Reader-tag bit decoder | 44 | 80 |
| Command analyzer | 2,426 | 20 |
| Command executor | 2,031 | 160 |
| Reply signal organizer | 342 | 20 |

TABLE-continued

| Block | Gate count | Clock frequency (kHz) |
|---|---|---|
| Tag-reader bit encoder | 135 | 40 |
| Memory controller | 262 | 160 |
| Clock signal generator | 182 | 160 |
| Sum | 5,701 | |

In the present simulation, the digital circuit was manufactured using gates of about 5.7 k and a digital core having a chip size of about 0.3 mm×0.3 mm. This digital core can be integrated with an analog circuit into a passive RFID tag.

Meanwhile, the passive RFID tag is exemplarily described in the foregoing embodiment, but the present invention is not limited thereto and can be easily applied to an active RFID tag using batteries.

According to the present invention as described above, the digital circuit for the passive RFID tag is constructed such that the respective blocks operate at different points in time. This precludes any useless operation of hardware, thus reducing the entire power dissipation.

Although exemplary embodiments of the present invention have been described with reference to the attached drawings, the present invention is not limited to these embodiments, and it should be appreciated to those skilled in the art that a variety of modifications and changes can be made without departing from the spirit and scope of the present invention.

What is claimed is:

1. A digital circuit for an RFID tag having a plurality of functional blocks, comprising:
   a command detector block for detecting command information in a data signal received from an analog circuit and determining a symbol timing to detect a preamble of the command information;
   a reader-tag bit decoder block for decoding bit data encoded in the command information;
   a command analyzer block for discerning the types of commands based on the decoded bit data and classifying parameters according to the types of commands;
   a command executor block for executing an operation and changing a tag's state in response to the analyzed command, the command executor block including a reply signal organizer for organizing a reply signal to be transmitted to a reader;
   a tag-reader bit encoder block for performing bit encoding in response to the reply signal to be transmitted to the reader;
   a memory controller block for writing data in a memory or reading data from the memory in response to a memory control signal; and
   a clock signal generator block for receiving output signals of each of the blocks to enable or disable clock signals of other blocks.

2. The digital circuit according to claim 1, wherein a clock signal having an optimized rate is transmitted to each of the functional blocks.

3. The digital circuit according to claim 1, wherein each of the blocks requires enabling of other blocks.

4. The digital circuit according to claim 1, wherein each of the blocks requires disabling of itself.

5. The digital circuit according to claim 1, wherein
   the command detector block is configured to be enabled by the clock signal generator block, when the clock signal generator block receives the data signal from the analog circuit; and the command detector block is configured to output a decoding start signal and a detector operation end signal to the clock signal generator block.

6. The digital circuit according to claim 5, wherein the reader-tag bit decoder block is configured to be enabled by the clock signal generator block, when the clock signal generator block receives the decoding start signal from the command detector block; and the reader-tag bit decoder block is configured to operate together with the command detector block until the detector operation end signal is sent to the clock signal generator block.

7. The digital circuit according to claim 1, wherein reader-tag bit decoder block is configured to operate at a clock rate equal to that of the command detector block.

8. The digital circuit according to claim 6, wherein the reader-tag bit decoder block is configured to transmit a decoded data signal to the command analyzer block; and the command analyzer block is configured to transmit a command analysis end signal to the clock signal generator block after finishing analyzing the decoded data signal.

9. The digital circuit according to claim 8, wherein the command executor block is configured to be enabled by the clock signal generator block using a command executor clock signal, after the clock signal generator block receives the command analysis end signal from the command analyzer block;

the command executor block is configured to output a memory request signal; and the command executor block is configured to be disabled when the clock signal generator block receives the memory request signal and enable the memory controller block.

10. The digital circuit according to claim 9, wherein the memory controller block is configured to be disabled by the clock signal generator block using a memory clock signal, after the clock signal generator block receives the memory control end signal from the memory controller block;

the command executor block is configured to be reactive by the clock signal generator block using command executor clock signal when the memory controller block is disabled.

11. The digital circuit according to claim 10, wherein the command executor block is configured to output a reply request signal and an execution end signal to the clock signal controller block, as well as outputting a reply signal parameter to the reply signal organizer after the execution of the command is finished; and the reply signal organizer is configured to be enabled by the clock signal generator block using a reply signal organizer clock signal in response to the reply request signal.

12. The digital circuit according to claim 11, wherein the reply signal organizer is configured to transmit a reply signal to the tag-reader bit encoder block;

the tag-reader bit encoder block is configured to be enabled by the reply signal from the reply signal organizer; and the tag-reader bit encoder block is configured to be disabled together with the reply signal organizer block by the clock signal generator block using a reply signal clock signal and an encoder clock signal.

* * * * *